(12) United States Patent
Hung

(10) Patent No.: US 8,331,047 B2
(45) Date of Patent: Dec. 11, 2012

(54) OPTICAL FILTER DEVICE WITH OPTICAL FILTER SWITCHABLE FUNCTION

(75) Inventor: Chun-Hui Hung, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 384 days.

(21) Appl. No.: 12/709,594

(22) Filed: Feb. 22, 2010

(65) Prior Publication Data
US 2011/0038069 A1    Feb. 17, 2011

(30) Foreign Application Priority Data
Aug. 13, 2009   (CN) .......................... 2009 1 0305602

(51) Int. Cl.
*G02B 5/22* (2006.01)
*G02B 7/00* (2006.01)

(52) U.S. Cl. .......................... 359/892; 359/889; 359/891
(58) Field of Classification Search .................. 359/892
See application file for complete search history.

(56) References Cited

U.S. PATENT DOCUMENTS 7,446,962 B2 * 11/2008 Matsumoto et al. .......... 359/819
8,120,831 B2 *  2/2012 Qian ............................. 359/889

FOREIGN PATENT DOCUMENTS
CN   101510042 A   8/2009

* cited by examiner

*Primary Examiner* — Jade R Chwasz
(74) *Attorney, Agent, or Firm* — Altis Law Group, Inc.

(57) ABSTRACT

An optical filter device switches two different optical filters through a frame with the optical filters received therein and being received in a seat formed on a casing. A driver fixed on the casing is employed to drives the frame through a gear fixed on the casing and engaged to the frame.

9 Claims, 6 Drawing Sheets

OPTICAL FILTER DEVICE WITH OPTICAL FILTER SWITCHABLE FUNCTION

BACKGROUND

1. Technical Field

The present disclosure relates to devices and, particularly, to a device capable of switching optical filters of a image capturing device.

2. Description of Related Art

Most of image capturing devices deploy an optical filter device to switch selectively different optical filters into the optical path to make special-effect images. Such an optical filter switch includes a frame disposed on a circuit board, which has an image sensor attached. The optical filters are slidably disposed on the frame.

The circuit board is often fastened to a rear board of a housing of the image capturing device, facing a front board of the housing. To provide sufficient space to allow the optical filters to slide, adequate clearance between the optical switch and the rear board, and clearance between the optical switch and the front board are required. As such, the image capturing device cannot be easily made as thin as desired.

Therefore, it is desirable to provide an optical filter device which can overcome the above-mentioned problems.

BRIEF DESCRIPTION OF THE FIGURES

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
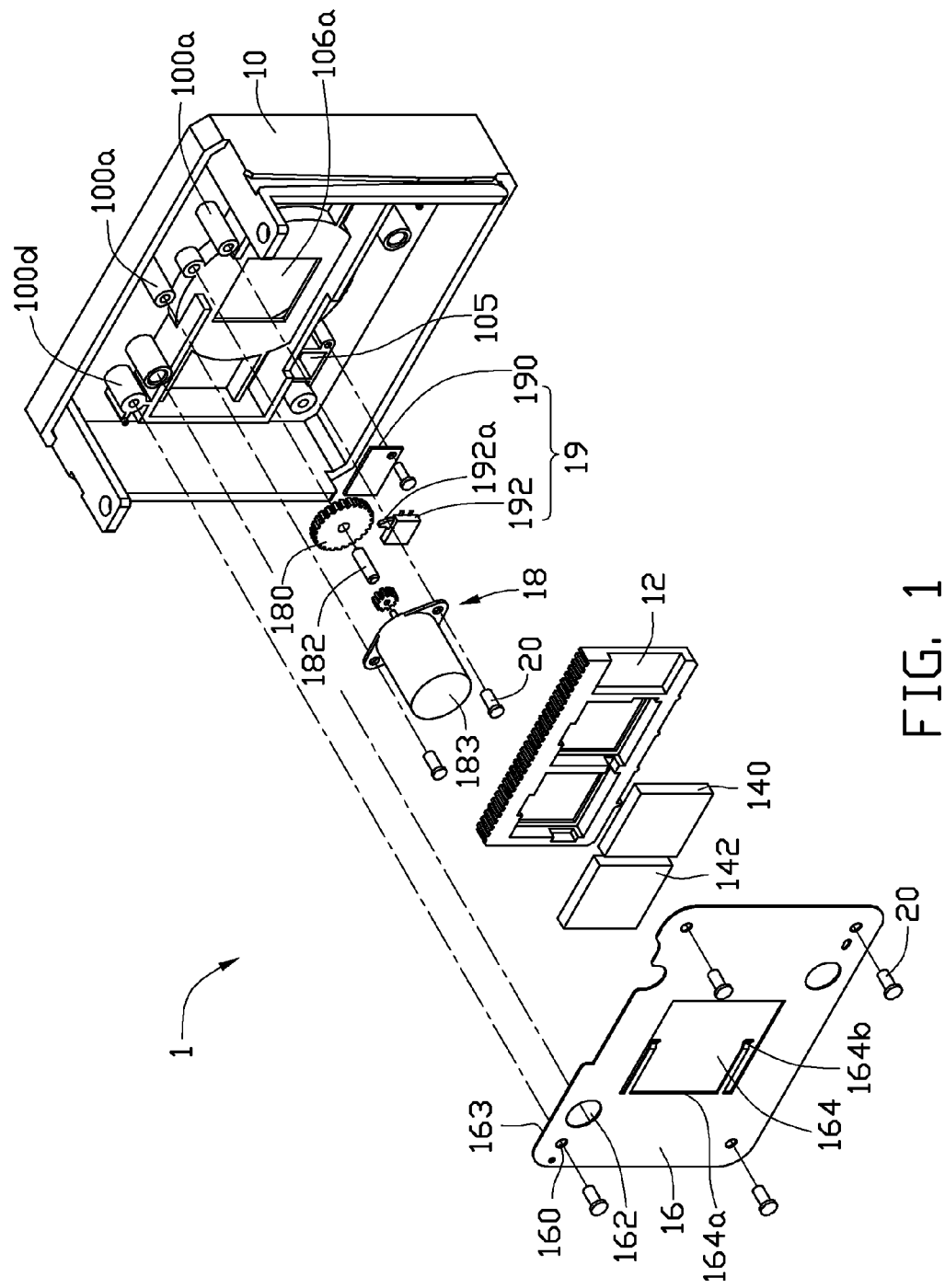
FIG. 1 is an exploded, schematic view of an exemplary embodiment of an optical filter device.

Referring to FIG. 1, an optical filter device 1, according to an exemplary embodiment, includes a casing 10, a driver 18, a detector 19, a frame 12, a first filter 142, a second filter 140, a cover 16, and a number of bolts 20.

Figure 2:
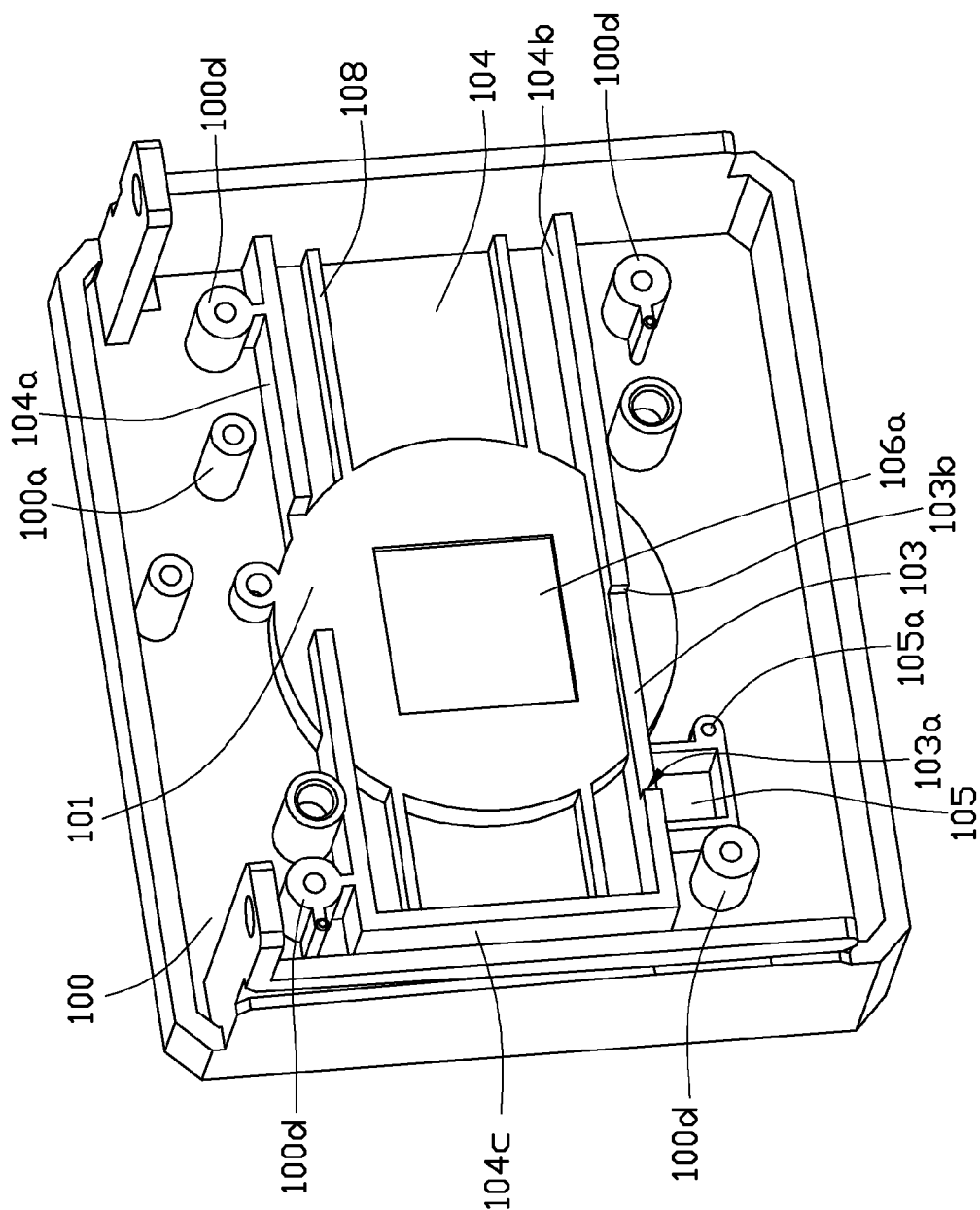
FIG. 2 is a schematic view of a casing of the optical filter device of FIG. 1.

Referring to FIG. 2, the casing 10 is substantially rectangular and includes a bottom slat 100, a railed seat 104, a holder 105, a number of first screw-receiving posts 100d, a pair of second screw-receiving posts 100a, and a third screw-receiving post 105a. The first screw-receiving posts 100d, the second screw-receiving posts 100a, and the third screw-receiving post 105a perpendicularly extend upwards from the bottom slat 100 at appropriate positions respectively.

The seat 104 includes a first sidewall 104a, a second sidewall 104b, a third sidewall 104c, and a pair of slide rails 108. The first sidewall 104a and the second sidewall 104b both perpendicularly extend upwards from the bottom slat 100, along the length of the bottom slat 100. The third sidewall 104c perpendicular extends upwards from the bottom slat 100, along the width of the bottom slat 100, and perpendicularly connects two ends of the first sidewall 104a and second sidewall 104b. The slide rails 108 perpendicularly extend from the bottom slat 100, along the length of the bottom slat 100, and between the first sidewall 104a and the second sidewall 104b. That is, the slide rails 108, the first sidewall 104a and the second sidewall 104b are parallel to each other and perpendicular to the third sidewall 104c.

The seat 104 defines a rectangular first through hole 106a through the bottom slat 100 between the slide rails 108. The seat 104 defines a transmission cutout 101 through the first sidewall 104a and a detection cutout 103 through the second sidewall 104b. The detection cutout 103 defines a first end surface 103a and a second end surface 103b. The first end surface 103a is opposite to the second end surface 103b. The second end surface 103b aligns with the center of the first through hole 106a.

The holder 105 is substantially rectangular and configured for holding the detector 19. The holder 105 is formed adjacent to the second sidewall 104b. The center of the holder 105 aligns to the first end surface 103a of the detection cutout 103. The third screw-receiving post 105a is formed adjacent to the holder 105.

Figure 3:
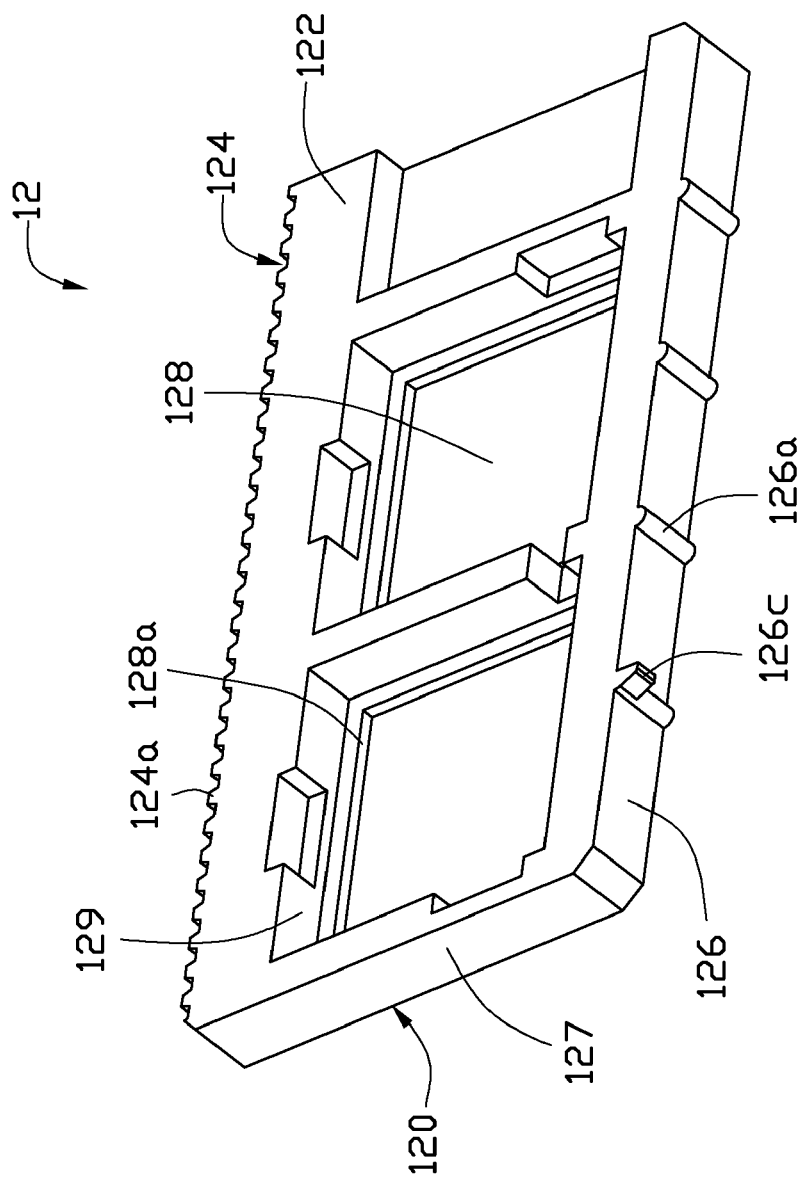
FIG. 3 is a schematic view of a frame of the optical filter device of FIG. 1.
Figure 4:
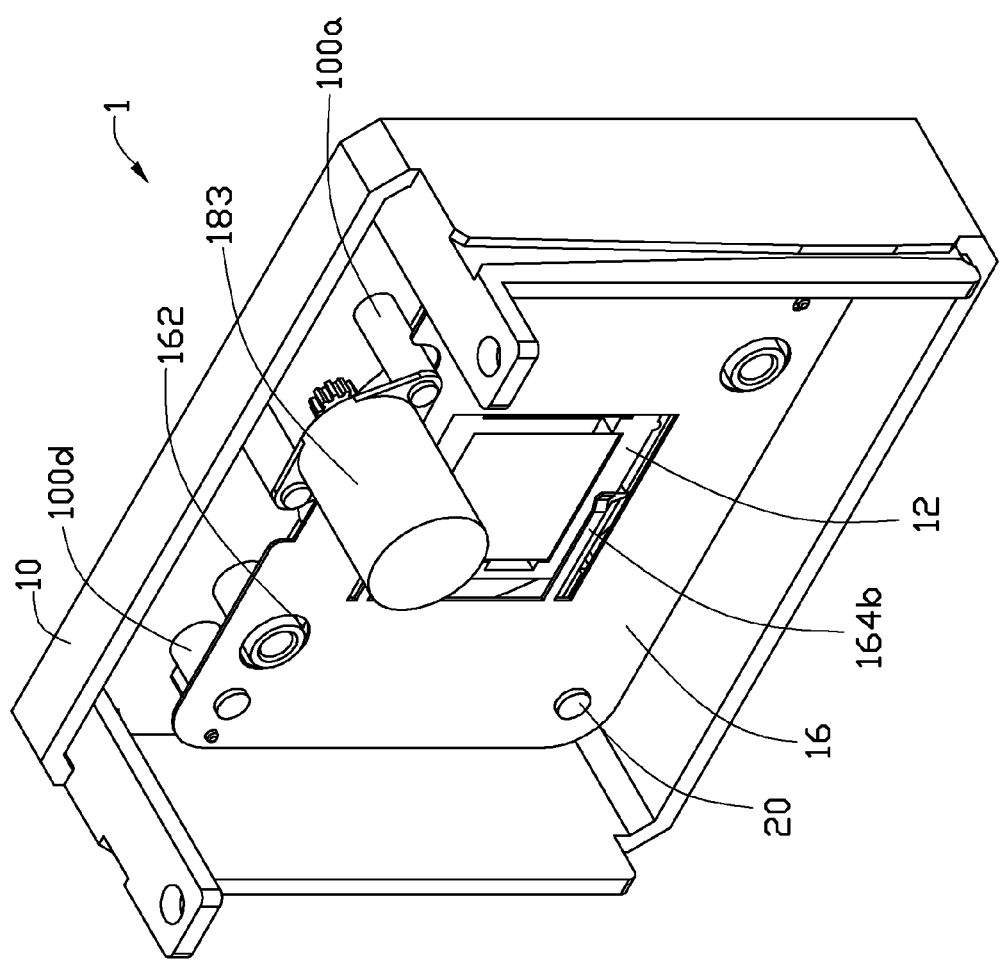
FIG. 4 is an assembled, schematic view of the optical filter device of FIG. 1.

Referring to FIG. 3, the frame 12 is substantially a rectangular plate and includes a top surface 124, a bottom surface 126, a first contact surface 122, a second contact surface 120, a side surface 127, a toothed rack 124a, a number of holding flanges 128a, a number of support humps 126a, and a detection protrusion 126c. The top surface 124 is parallel and opposite to the bottom surface 126. The first contact surface 122 is parallel and opposite to the second contact surface 120. The side surface 127 perpendicularly connects the first contact surface 122 and the second contact surface 120, and perpendicularly connects the top surface 124 and the bottom surface 126.

The frame 12 defines two rectangular receiving through holes 128 through the first contact surface 122 and the second contact surface 120. The receiving through holes 128 are arranged in a line parallel to the top surface 124. The receiving through holes 128 define an inner sidewall 129. The holding flanges 128a perpendicularly extend towards the receiving through holes 128 from the inner sidewall 129 and are positioned close to the second contact surface 120.

The toothed rack 124a is formed on the top surface 124. The support humps 126a are substantially semi-cylindrical and extend outwards from the bottom surface 126 spaced at a predetermined distance. The longitudinal direction of the support humps 126a is perpendicular to the first contact surface 122. The support hump 126a adjacent to the side surface 127 aligns to the center of the adjacent receiving through hole 128. The detection protrusion 126c is triangular and extends outwards from the circumferential surface of the support hump 126a adjacent to the side surface 127. In this embodiment, four support humps 126a are employed.

Referring back to FIG. 1, the first optical filter 142 and the second optical filter 140, such as, a red light filter, a green light filter, or a blue light filter, are for exclusively passing different color lights.

The detector 19 includes a circuit board 190 and a positioning sensor 192 electrically mounted on the circuit board 190. The positioning sensor 192 includes a trigger 192a for sensing the position of the frame 12. The positioning sensor 192 generates a signal when the detection protrusion 126c presses the trigger 192a.

The cover 16 is rectangular and includes a pair of positioning arms 164b and a pair of parallel sides 163 corresponding to the first sidewall 104a and the second sidewall 104b. The cover 16 is sized to entirely cover the seat 104. The cover 16 defines a second through hole 164 corresponding to the first through hole 106a. The second through hole 164 defines a pair of parallel inner sides 164a, perpendicular to the sides 163. The positioning arms 164b are flexible and perpendicularly extend from one of the inner sides 164a inwardly to the second through hole 164 and parallel to the sides 163.

The cover 16 also defines a number of screw through holes 160 corresponding to the first screw-receiving posts 100d.

Referring to FIGS. 1-4, in assembly, the frame 12 is slidably received in the seat 104. The second contact surface 120 slidably contacts the slide rails 108. The toothed rack 124a faces the first sidewall 104a. The support humps 126a slidably contact the second sidewall 104b. The detection protrusion 126c is received in the detection cutout 103 and is movable in the detection cutout 103 along the direction parallel to the second sidewall 104b.

A gear 180 coaxially and rotatably sleeve a shaft 182 perpendicularly fixed to the bottom slat 100. The gear 180 meshes with the toothed rack 124a of the frame 12 through the transmission cutout 101. The driver 18 is fastened to the bottom slat 100 by engaging to the screw-receiving posts 100a through the bolts 20. The driver 18 is coupled to the gear 180 (e.g., a rotor meshing with the gear) repelling the frame 12 to slide.

The circuit board 190 is held by the holder 105 throughout the engagement of the bolts 20 into the third screw-receiving posts 105a. Mounted on the circuit board 190, the position sensor 192 transmits the signal to the other control device, a central processing unit for example. The trigger 192a is received in the detection cutout 103 and closed to the first end surface 103a of the detection cutout 103.

The first optical filter 142 and the second optical filters 140 are correspondingly received in the receiving through holes 128 and supported on the holding flanges 128a.

The screw through holes 160 are correspondingly aligned with the first screw-receiving posts 100d. The second through hole 164 aligns with the first through hole 106a. The bolts 20 correspondingly pass through the screw through holes 160 and screw into the first screw-receiving posts 100d to fasten the cover 190 to the seat 104. The positioning arms 164b support the first contact surface 122 of the frame 12 to prevent the frame 12 from falling out of the seat 104.

Figure 5:
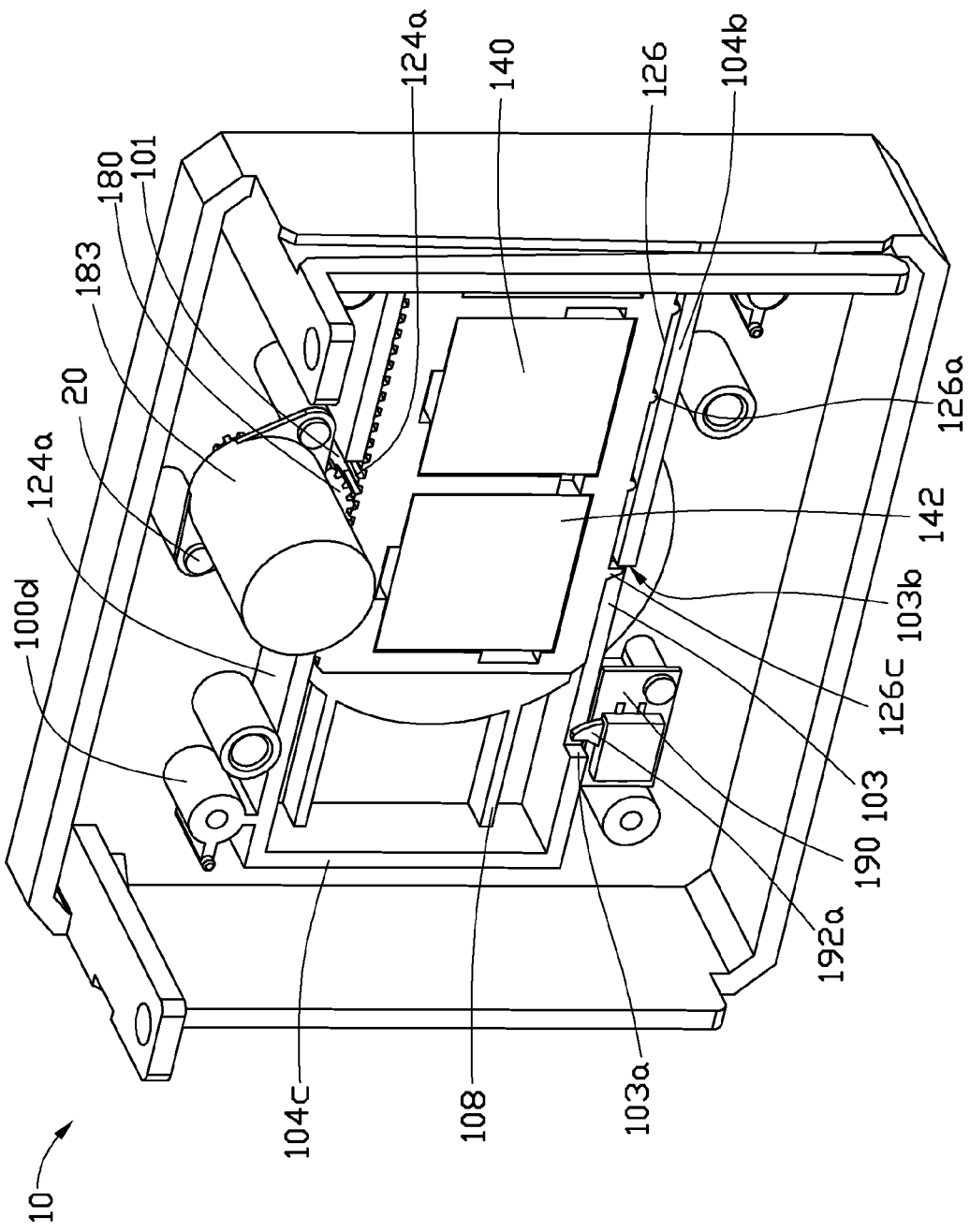
FIG. 5 is a schematic view of the optical filter device of FIG. 1 when a first optical filter is employed.
Figure 6:
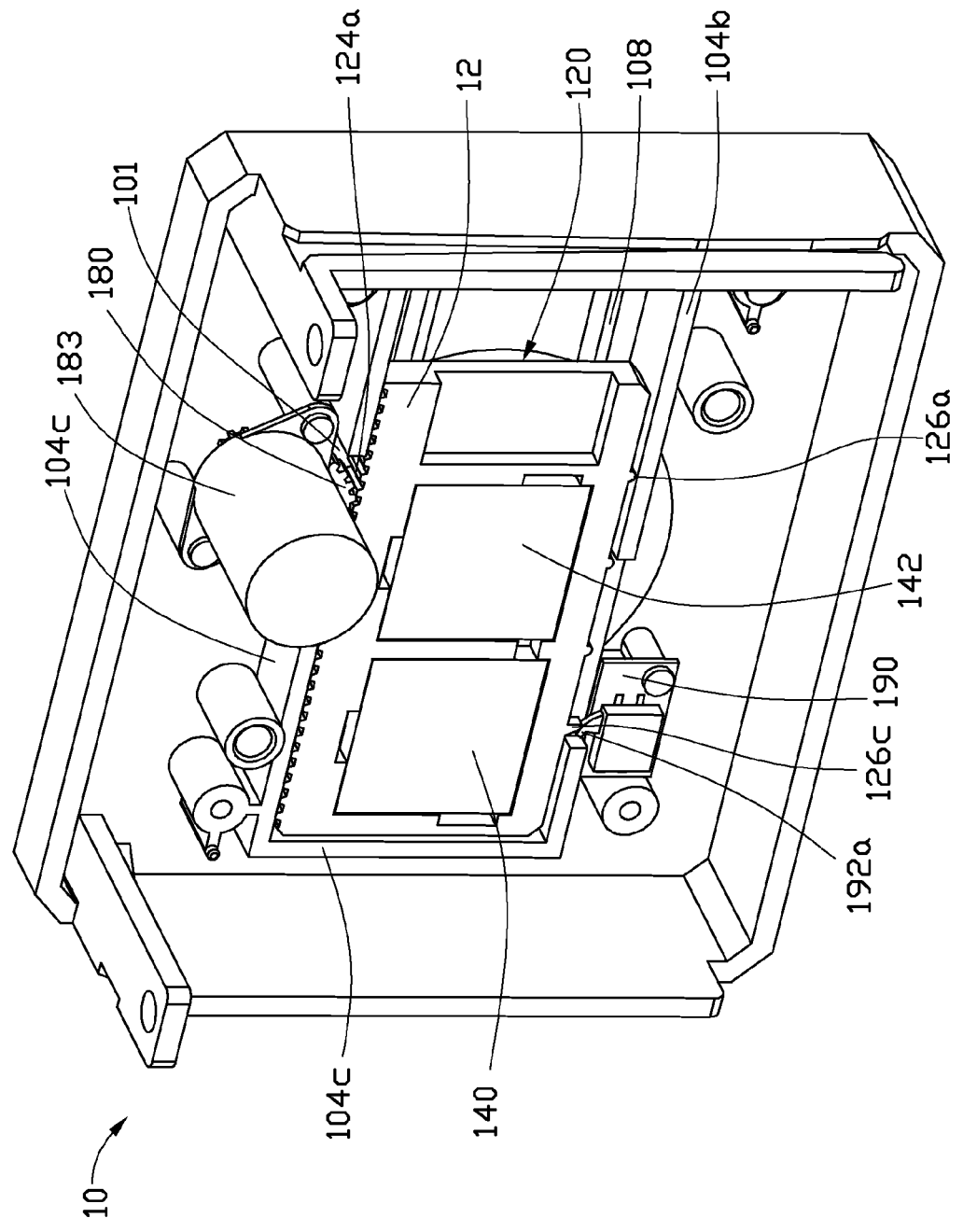
FIG. 6 is a schematic view of the optical filter switch of FIG. 1, when a second optical filter is employed.

Also referring to FIGS. 5 and 6, in use, the optical filter device 1 is installed in a image capturing device (not shown) to selectively switch the first optical filter 142 or the second optical filter 140 into or back from the optical path of the image capturing device. When the first optical filter 142 is to be situated into the optical path of the image capturing device, the driver 183 drives the frame 12 to slide apart from the third sidewall 104c until the detection protrusion 126c pushes against the second end surface 103b. Thus, the first optical filter 142 is aligned to the first through hole 106a. The position sensor 192 generates no signal for indicating the first optical filter 142 to be engaged.

When the second optical filter 140 is to be engaged, the driver 183 drives the frame 12 to slide towards the side surface 104c until the detection protrusion 126c pushes against the trigger 192a. The second optical filter 140 is aligned with the first through hole 106a. The position sensor 192 generates the signal for indicating the second optical filter 140 to be engaged.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. An optical filter device comprising:
   a casing comprising a bottom slat and a railed seat formed on the bottom slat, the seat comprises a first sidewall and a second sidewall parallel to the first sidewall, the seat defines a first through hole on the bottom slat between the first sidewall and the second sidewall, the seat defines a transmission cutout through the first sidewall;
   a frame slidably received in the seat, the frame comprising a top surface corresponding to the first sidewall and a bottom surface corresponding to the second sidewall, and defining a pair of receiving through holes arranged in a line parallel to the top surface;
   two different optical filters correspondingly received in the receiving through holes;
   a driver fixed on the bottom slat for driving the frame to slide through the transmission cutout; and
   a cover fastened to the casing for covering the seat, the cover defines a second through hole corresponding to the first through hole.

2. The optical filter device as claimed in claim 1, wherein the casing is substantially a rectangular case and further comprises a holder formed on the bottom slat, the seat defines a detection cutout through the second sidewall, the detection cutout defines a first end surface and a second end surface opposite to the first end surface, the holder is formed adjacent to the second sidewall, a center of the holder aligns to the first end surface.

3. The optical filter device as claimed in claim 2, wherein the frame is substantially a rectangular plate and comprises a first contact surface perpendicularly connected to the top surface, a second contact surface parallel to the first contact surface, a side surface perpendicularly connected to the first contact surface and the top surface, a plurality of support humps, and a detection protrusion, the support humps extend outwards from the bottom surface spaced at a predetermined distance, the support hump adjacent to the side surface aligns to the center of the receiving through hole, the detection protrusion is triangular and extends outwards from the circumferential surface of the support hump adjacent to the side surface.

4. The optical filter device as claimed in claim 3, wherein the optical filter device further comprises a detector, the detector comprises a circuit board and a position sensor electrically mounted on the circuit board, the position sensor comprises a trigger, the circuit board is fixed on the holder, when the frame is received in the seat, the trigger is received in the detection cutout and adjacent to the first end surface, the support humps contact and slide on the second sidewall, the detection protrusion is received in the detection cutout and slides in the detection cutout along the direction parallel to the second sidewall, the position sensor generates a first position signal when the detection protrusion pressed the trigger.

5. The optical filter device as claimed in claim 3, wherein the support humps are substantially cylindrical, the longitudinal direction of the support humps is perpendicular to the first contact surface.

6. The optical filter device as claimed in claim 3, wherein the frame comprises a toothed rack, the toothed rack is formed on the top surface, the optical filter device comprising a gear coaxially and rotatably sleeved onto a shaft perpendicularly fixed to the bottom slat, the gear meshes with the toothed rack through the transmission cutout, the driver is coupled to the gear repelling the frame to slide.

7. The optical filter device as claim in claim 3, wherein the frame comprises a number of holding flanges, the receiving through holes each defines an inner sidewall, the holding flanges perpendicularly extend towards the receiving through hole from the inner sidewall and are positioned close to the second contact surface.

8. The optical filter device as claimed in claim 1, wherein the cover is substantially rectangular and comprises a pair of positioning arms and a pair of parallel sides corresponding to the first sidewall and the second sidewall, the cover is sized so as to entirely cover the seat, the second through hole defines a pair of parallel inner sides perpendicular to the sides, the positioning arms are flexible and perpendicularly extend from the inner side inwardly to the second through hole, the positioning arm press against the first contact surface of the frame to prevent the frame from falling out of the seat.

9. The optical filter device as claimed in claim 1, wherein the driver drives the frame through a gear coaxially and rotatably sleeved onto a shaft perpendicularly fixed to the bottom slat, the gear meshes with the frame through the transmission through hole.

* * * * *